Figure 1:
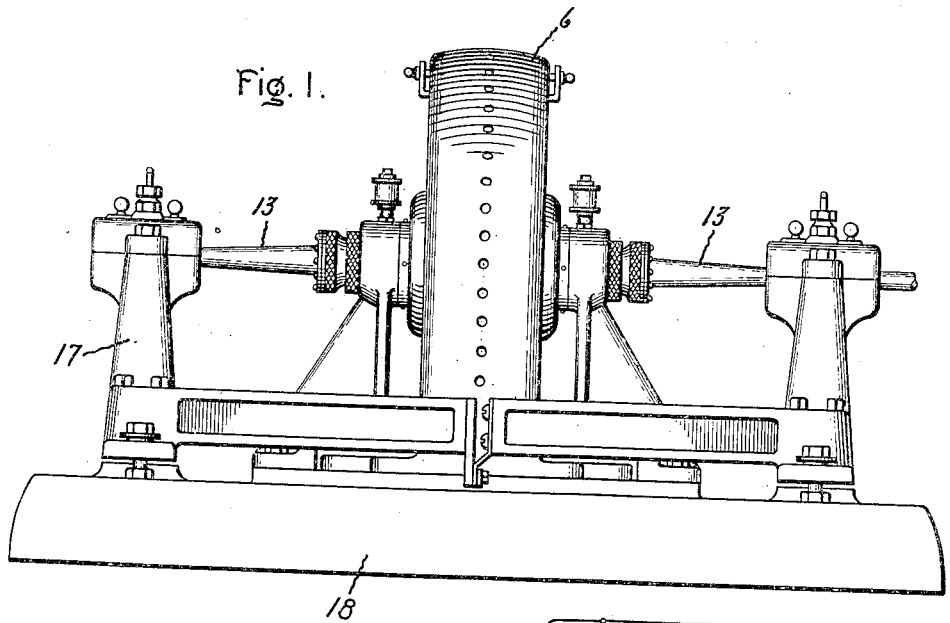

E. F. W. ALEXANDERSON.
HIGH FREQUENCY ALTERNATOR.
APPLICATION FILED JULY 17, 1912.

1,126,334.

Patented Jan. 26, 1915.
2 SHEETS—SHEET 2.

Witnesses:
Earl G. Klock.
J. Ellis Glen

Inventor:
Ernst F. W. Alexanderson,
by Albert G. Davis
His Attorney.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

HIGH-FREQUENCY ALTERNATOR.

1,126,334.  Specification of Letters Patent.  Patented Jan. 26, 1915.

Application filed July 17, 1912. Serial No. 709,878.

*To all whom it may concern:*

Be it known that I, ERNST F. W. ALEXANDERSON, a citizen of the United States, residing at Schenectady, county of Schenectady, State of New York, have invented certain new and useful Improvements in High-Frequency Alternators, of which the following is a specification.

My invention relates to high frequency alternators, and particularly to alternators adapted to be employed as telephone relays or reinforcers, and of that general type disclosed in my prior Patents No. 902,195, dated October 27, 1908, No. 996,445, dated June 27, 1911, and No. 1,008,577, dated November 14, 1911.

The object of my present invention is to provide a novel form of winding for high frequency alternators of the type above identified, which is adapted to produce the necessary excitation with an exciting current of small magnitude, such, for example, as the current flowing in a telephone circuit.

A further object of my invention is to provide means in an alternator of this type for choking the flow of the induced currents in the exciting circuit, and simultaneously transforming the induced current to render it available at the desired voltage in the external working circuit.

In my prior patents, I have shown and described a winding for the stator in which each coil spans only one tooth or pole of the rotor. In these machines the coil pitch corresponds to the number of poles. In a machine of this type there is no definite relation between the coil pitch and the frequency, since the latter is a function of the number of teeth on the stationary and the rotating members. The coil pitch of the stator winding may, therefore, be varied without altering the frequency.

I accomplish the first object of my invention by making use of the above principle. I place upon the stator of the machine a winding of which each coil embraces more than one pole of the rotor. I have found that such a form of winding is of decided advantage where it is desired to operate the machine with a very small excitation, such as a current flowing in a telephone circuit. In practice I arrange the several coils of the winding concentrically so as to increase the magnetic density; the smallest of these coils embracing more than one pole of the rotor. It is not necessary that my new form of winding go all around the stator, and, if desired, the winding may be concentrated at one, two, or more points.

In a machine of this type it is necessary to provide some means for preventing the induced alternating voltage from short circuiting the direct current exciter. In my prior Patent No. 996,445, I accomplish this result by designing the winding of the machine with two circuits of 180 degrees phase displacement. My present invention accomplishes this same result in a novel and simple manner by connecting the primary of a transformer in series with the source of excitation. This primary winding of the transformer thus performs the functions of a choke coil in the direct current exciter circuit. The secondary winding of the transformer is designed to give the desired voltage on the external working circuit.

The novel features which I believe to be characteristic of my invention will be definitely indicated in the claims appended hereto. The features of construction and mode of operation will be understood by reference to the following description taken in connection with the accompanying drawings which show the preferred embodiments of my invention, and in which—

Figure 5:
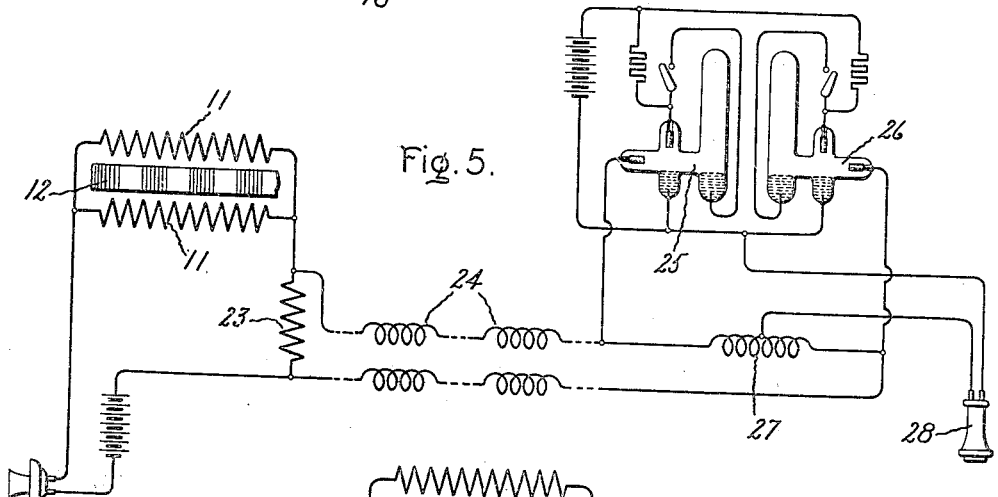
Figure 4:
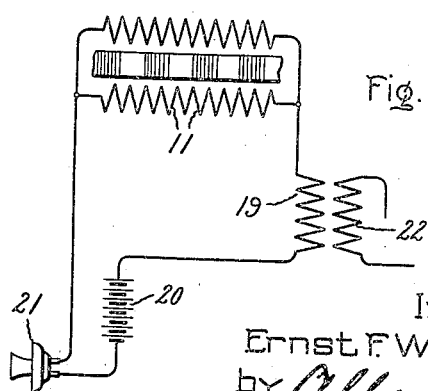
Figure 2:
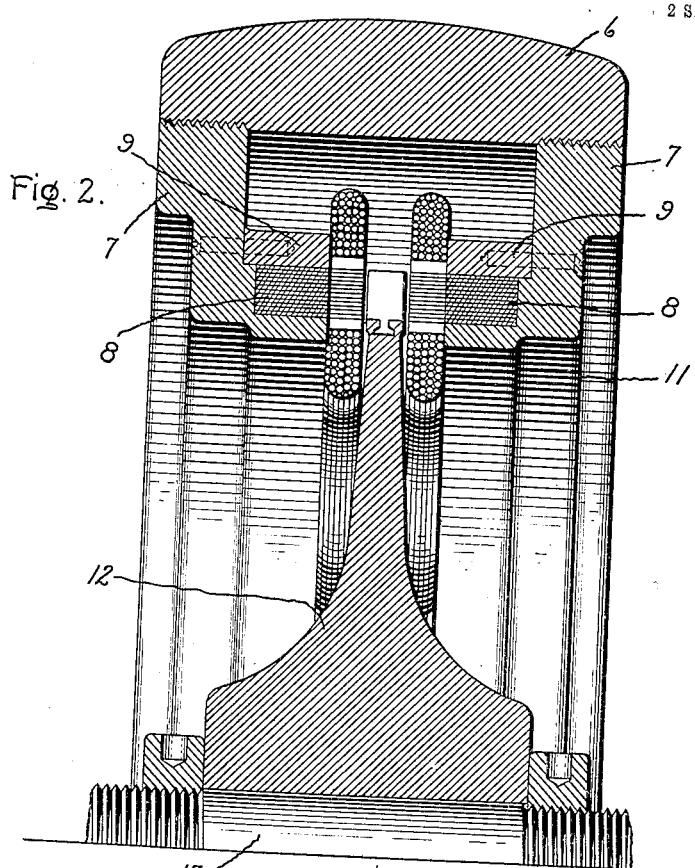
Figure 3:
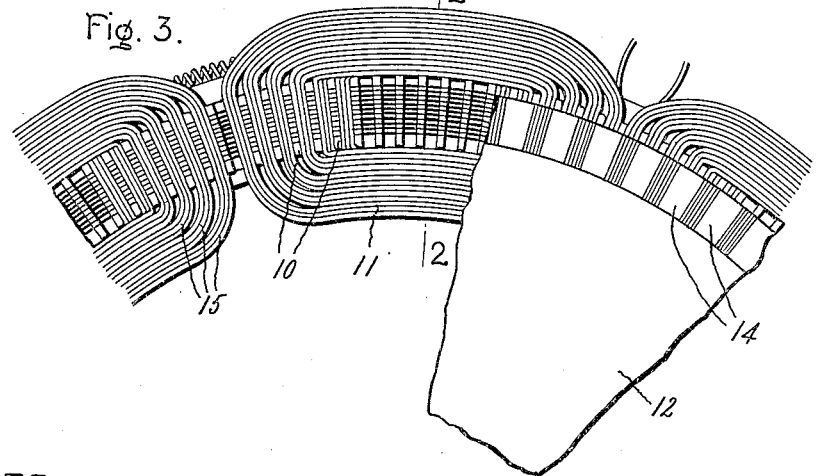

Figure 1 is a side elevation of a high frequency alternator embodying the novel features of my invention; Fig. 2 is a vertical cross section of the upper half of the machine taken along the line 2—2 of Fig. 3; Fig. 3 is an enlarged detail view showing the novel arrangement of the coils on the stator; Fig. 4 is a diagrammatic view of the winding of the alternator with the primary winding of a transformer in the exciter circuit; and Fig. 5 is a slight modification thereof, showing also the alternator connected as a relay in a telephone system.

Referring first to Figs. 1, 2 and 3 of the drawings, there is shown a stator 6 into which are screw-threaded a pair of ring-shaped members 7—7. Each of these members carries a circumferentially extending laminated ring 8 clamped in position by an annular ring 9. The laminated rings 8 have their opposite faces lying in adjacent radial planes, and are provided with slots 10 for the reception of the stator winding 11. A magnetic rotor 12 is mounted on a flexible shaft 13 and has its periphery extending between the adjacent radial faces of the rings 8. The periphery of the rotor is provided with teeth made of laminations, as described in my former Patent No. 996,445, in order to form magnetic poles opposite the faces of the laminated rings 8. The spaces between the teeth are filled with non-magnetic material, for example, aluminum, as shown at 14 in Fig. 3. The arrangement of the winding on the stator, which forms one of the essential features of my invention, is shown in Fig. 3. The winding is laid out so as to use the copper most efficiently for field excitation by permitting the coils to span a number of rotor poles. As shown in this figure, the winding consists of several sections and each section comprises a number of concentrically arranged coils 15. Each of these coils embraces or spans a number of poles of the rotor, and in the drawings it will be seen that the smallest coil spans about four rotor poles. The several coils of each section are connected in series and the several sections are likewise so connected. I have found that amplification is most effective when the same winding is used for both the primary exciting or direct current and the secondary high frequency current, and accordingly I have shown the winding 11 adapted to carry both of these currents. It is obvious, however, that separate windings may be employed for the primary and secondary circuits without departing from the spirit of my invention. The shaft 13 is journaled in bearings mounted on the standards 17, which latter are supported by a horizontal base 18. The mechanical features of the construction of this type of alternator are fully described in my aforementioned Patent No. 1,008,577, and I do not, therefore, consider it necessary to describe the same in detail here.

The principle of operation of my machine differs somewhat from an ordinary inductor alternator. In machines of the latter type there is a constant flux in the field core which is thrown into different parts of the armature by means of a revolving field pole. In the machine herein described the magnetic flux substantially disappears in every half cycle. When the poles of the rotor are opposite the teeth of the laminated rings 8, the magnetic resistance is small and the flux created by the exciting current has its maximum value. On the other hand, when the poles of the rotor are opposite the slots of the rings 8, the flux is a minimum. Thus the flux of the machine oscillates between a maximum and a minimum value, and in this way induces an alternating current in the winding.

It will, of course, be understood from the foregoing description that the connections of the individual sections of the stator winding are such as to produce alternate north and south poles. That is, each coil of the same section produces a magnetization of the same polarity so that all of the rotor poles spanned by a particular section are of the same polarity, but the magnetization produced by adjacent sections is alternately north and south, so that alternate groups of north and south poles are produced in the rotor. In other words the pole pitch of magnetization is relatively large, whereas the pole pitch of the induced alternating current is relatively small.

In generators of this type, it is necessary to place an inductive resistance in the exciting or direct current circuit in order to prevent a short circuiting by the source of excitation of the winding in which the alternating voltage is induced. In my prior Patent No. 996,445, I accomplished this result by a novel arrangement of the stator winding of the generator or relay. According to my present invention I propose to use for this purpose a transformer having its primary acting as the inductive resistance or as a choke coil. The secondary winding of the transformer will be wound to produce the desired voltage on the external circuit. In Fig. 4 I have shown a transformer operating in this capacity. The primary winding 19 of this transformer acts as a choke coil in the direct current circuit, which latter is completed through the battery 20, the telephone transmitter 21 and the windings 11. The winding 19 also serves as a means for supplying the high frequency current induced in the stator winding to the external working circuit. The secondary winding 22 of the transformer will, therefore, perform the functions of a choke coil in the direct current exciting circuit and of a transformer in the high frequency alternating current circuit.

Where the ratio of transformation is 1:1, an auto transformer 23 may be employed as shown in Fig. 5. In this case the winding 23 serves as the inductive resistance in the direct current circuit and also as the source of supply from which to tap the high frequency current. Fig. 5 also shows the connections in a system employing my high frequency alternator, as a telephone relay or reinforcer. This system consists generally of inductive resistances 24 for tuning the telephone circuit, mercury vapor rectifiers 25 and 26, and a reactive coil 27 connected across the two rectifiers whereby a continuous unidirectional current flows in a secondary circuit including the telephone receiver 28. The features of construction of such a system are fully described in my prior Patent No. 946,445.

I do not desire to limit myself to the particular construction and arrangement of parts here shown, but aim in the appended claims to cover all modifications which are within the scope of my invention.

What I claim as new and desire to secure by Letters Patent of the United States, is,—

1. A high frequency alternator comprising a rotor adapted to be driven at high speed and having a large number of magnetic poles, a stator having slots adjacent to the rotor poles, and a winding carried in the stator slots and embracing more than one rotor pole.

2. A high frequency alternator comprising a rotor adapted to be driven at high speed and having a large number of magnetic poles, a stator having slots adjacent to the rotor poles, a winding comprising a plurality of concentric coils carried in the stator slots, each coil of the winding embracing more than one rotor pole.

3. A high frequency alternator comprising a rotor adapted to be driven at high speed and having a large number of magnetic poles, a stator having slots adjacent to the rotor poles, a plurality of windings carried in the stator slots, each winding comprising a number of concentric coils and each coil embracing a number of rotor poles.

4. A high frequency alternator comprising a rotor adapted to be driven at high speed and having a number of magnetic poles, a stator having slots adjacent to the rotor poles, an exciting winding carried in the stator slots, and means connected to said winding for choking the current induced in the exciting winding and for simultaneously transforming such current.

5. A high frequency alternator comprising a rotor adapted to be driven at high speed and having a number of magnetic poles, a stator having slots adjacent to the rotor poles, an exciting winding carried in the stator slots, and a transformer having its primary winding connected to the exciting winding.

6. A high frequency alternator comprising a rotor adapted to be driven at high speed and having a number of magnetic poles, a stator having slots adjacent to the rotor poles, a winding secured in the stator slots for carrying the exciting current and the induced current, an inductive resistance connected to said stator winding for choking the induced current in the exciting circuit, and means for supplying the induced current to an external circuit from said inductive resistance.

7. A high frequency alternator comprising a rotor adapted to be driven at high speed and having a number of magnetic poles, a stator having slots adjacent to the rotor poles, an exciting winding carried in the stator slots, and means connected to said winding for choking in the exciting circuit the flow of currents induced in the exciting winding and for simultaneously supplying said induced currents to an external circuit.

8. A high frequency alternator comprising a rotor adapted to be driven at high speed and having a large number of magnetic poles, a stator having slots adjacent to the rotor poles, a single winding secured in the stator slots for carrying the exciting current and the induced current, and means connected to said stator winding for choking the induced currents in the exciting circuit and simultaneously transforming the induced currents.

9. A high frequency alternator comprising a rotor adapted to be driven at high speed and having a large number of magnetic poles, a stator having slots adjacent to the rotor poles, a single winding secured in the stator slots for carrying the exciting current and the induced current, and a transformer having its primary winding connected to the stator winding.

10. A high frequency alternator comprising a rotor adapted to be driven at high speed and having a large number of magnetic poles, a stator having slots adjacent to the rotor poles, a winding carried in the stator slots and embracing a number of rotor poles, and a transformer winding connected to the stator winding.

In witness whereof, I have hereunto set my hand this 16th day of July, 1912.

ERNST F. W. ALEXANDERSON.

Witnesses:
BENJAMIN B. HULL,
HELEN ORFORD.